(12) United States Patent
Hoff

(10) Patent No.: US 12,011,668 B2
(45) Date of Patent: Jun. 18, 2024

(54) FANTASY SPORTS TEAM LEAGUE

(71) Applicant: David Hoff, Sudbury, MA (US)

(72) Inventor: David Hoff, Sudbury, MA (US)

(*) Notice: Subject to any disclaimer, the term of this patent is extended or adjusted under 35 U.S.C. 154(b) by 193 days.

(21) Appl. No.: 17/707,181

(22) Filed: Mar. 29, 2022

(65) Prior Publication Data

US 2022/0314128 A1    Oct. 6, 2022

Related U.S. Application Data

(60) Provisional application No. 63/169,680, filed on Apr. 1, 2021.

(51) Int. Cl.
*A63F 13/828* (2014.01)
*A63F 13/35* (2014.01)
*A63F 13/795* (2014.01)

(52) U.S. Cl.
CPC .......... *A63F 13/828* (2014.09); *A63F 13/35* (2014.09); *A63F 13/795* (2014.09)

(58) Field of Classification Search
USPC ........................................................... 463/42
See application file for complete search history.

(56) References Cited

U.S. PATENT DOCUMENTS

| | | | |
|---|---|---|---|
| 7,922,570 B2 * | 4/2011 | Del Prado | A63F 13/87 463/40 |
| 8,177,644 B2 | 5/2012 | Anderson et al. | |
| 8,678,930 B2 | 3/2014 | Gabrail et al. | |
| 9,555,325 B2 | 1/2017 | Gabrail et al. | |
| 9,984,535 B2 | 5/2018 | Odom | |
| 10,159,893 B2 | 12/2018 | Gotkin | |
| 10,463,975 B2 * | 11/2019 | Lazarus | A63B 71/06 |
| 10,463,976 B2 | 11/2019 | Gabrail et al. | |
| 10,744,401 B2 | 8/2020 | Gotkin | |
| 2006/0064184 A1 | 3/2006 | Ream et al. | |
| 2006/0252476 A1 * | 11/2006 | Bahou | A63F 13/30 463/4 |
| 2007/0054718 A1 * | 3/2007 | Del Prado | A63F 13/792 463/1 |
| 2007/0233585 A1 | 10/2007 | Ben Simon et al. | |
| 2010/0210330 A1 | 8/2010 | Fleming | |
| 2011/0183734 A1 | 7/2011 | Koivisto et al. | |
| 2012/0270614 A1 | 10/2012 | Robinson | |
| 2013/0079073 A1 * | 3/2013 | Sharifi | A63F 13/45 463/3 |
| 2013/0079130 A1 | 3/2013 | Takacs | |

(Continued)

FOREIGN PATENT DOCUMENTS

| | | | | |
|---|---|---|---|---|
| WO | WO-2008021448 A2 * | 2/2008 | | G07F 17/32 |
| WO | WO-2016191860 A1 * | 12/2016 | | A63F 13/00 |
| WO | WO-2020037422 A1 * | 2/2020 | | |

*Primary Examiner* — Michael A Cuff
(74) *Attorney, Agent, or Firm* — Morse, Barnes-Brown & Pendleton, P.C.; Sean D. Detweiler, Esq.

(57) ABSTRACT

A method and system for implementing a fantasy sports team league. The fantasy sports team league provides team managers a way of competing in fantasy sports competitions that addresses the weaknesses of existing opportunities. This presented fantasy sports team league provides an unconventional season-long game-play format incorporating a salary cap and dynamic pricing model, and it provides practical applications including several new and unconventional features for fantasy team managers to experience.

31 Claims, 9 Drawing Sheets

(56) References Cited

U.S. PATENT DOCUMENTS

| | | | |
|---|---|---|---|
| 2014/0045595 A1* | 2/2014 | Baschnagel, III | A63F 13/79 463/40 |
| 2015/0273345 A1 | 10/2015 | Ford | |
| 2015/0273346 A1 | 10/2015 | Ford | |
| 2016/0354698 A1* | 12/2016 | Gotkin | A63F 13/00 |
| 2017/0036120 A1 | 2/2017 | Knittel | |
| 2019/0362600 A1 | 11/2019 | Odom | |
| 2020/0023278 A1 | 1/2020 | Perkin | |
| 2020/0360822 A1 | 11/2020 | Mix | |
| 2021/0077909 A1* | 3/2021 | Butz | A63F 13/46 |
| 2021/0350675 A1* | 11/2021 | Ryan | G07F 17/3288 |

* cited by examiner

| Offensive Scoring | |
|---|---|
| Passing TD | +4 Points |
| Passing Yards | +1 Points/25 Yards (0.04 Points/ Yard) |
| Passing Yards Bonus | +3 Points if 300+ Yards |
| Interception | -2 Points |
| Rushing TD | +6 Points |
| Rushing Yards | +1 Points/10 Yards (0.1 Points/ Yard) |
| Rushing Yards Bonus | +3 Points if 100+ Yards |
| Receiving TD | +6 Points |
| Receiving Yards | +1 Points/10 Yards (0.1 Points/ Yard) |
| Receiving Yards Bonus | +3 Points if 100+ Yards |
| Reception | +.5 Points |
| Return for TD (Punt, Kickoff, or FG Return) | +6 Points |
| Fumble Lost | -2 Points |
| 2 Point Conversion (Pass, Run, or Catch) | +2 Points |
| Offensive Fumble Recovery TD | +6 Points |
| Defensive/Special Teams/Kicking Scoring | |
| Sack | +1 Point |
| Interception, Safety, Fumble Recovery | +2 Points |
| Blocked Kick (Extra Point, Field Goal, or Punts) | +2 Points |
| Return for TD | +6 Points |
| Return for 2 Points (2 Point Conversion or Extra Point) | +2 Points |
| Points Allowed: 0 | +10 Points |
| Points Allowed: 1-6 | +7 Points |
| Points Allowed: 7-13 | +4 Points |
| Points Allowed: 14-20 | +1 Points |
| Points Allowed: 21-27 | +0 Points |
| Points Allowed: 28-34 | -1 Point |
| Points Allowed: 35+ | -4 Points |
| Extra Point | +1 Point |
| Missed Extra Point | -1 Point |
| 0-39 Yard FG | +3 Points |
| 40-49 Yard FG | +4 Points |
| 50+ Yard FG | +5 Points |
| Missed Field Goal | -2 Points |

FIG. 4

| Free Transfers Available | 2 | DoubleUp | Roster Overhaul | One-Week Wonder |
|---|---|---|---|---|
| Cash Available | 2,000 | Available | Played Wk3 | Available |

| CURRENT ROSTER | | | | | | FREE AGENTS | | | |
|---|---|---|---|---|---|---|---|---|---|
| Player | Team | Investment Cost ($) | Current Price ($) | Total Points | | Available Player | Team | Total Points | Current Price ($) |
| QBs | | | | | | QBs | | | |
| Mahomes | KC | 8,500 | 8,800 | 240.05 | WAIVE | Rogers | GB | 225.20 | 9,800 |
| Ryan | ATL | 6,500 | 6,500 | 195.40 | WAIVE | Brees | NO | 215.60 | 9,600 |
| RBs | | | | | | RBs | | | |
| Chubb | CLE | 9,000 | 9,000 | 125.35 | WAIVE | McCaffrey | CAR | 175.00 | 11,000 |
| White | NE | 5,700 | 5,500 | 95.60 | WAIVE | Cook | MIN | 169.50 | 10,500 |
| Hunt | KC | 7,500 | 7,600 | 152.35 | WAIVE | Kamara | NO | 160.25 | 10,300 |
| Murray | NO | 5,000 | 5,100 | 140.40 | WAIVE | Henry | TEN | 158.75 | 10,200 |
| WRs | | | | | | WRs | | | |
| Adams | GB | 9,200 | 9,300 | 200.10 | WAIVE | Jones | ATL | 195.50 | 9,900 |
| Coutee | HOU | 5,500 | 5,600 | 80.45 | WAIVE | Thielen | MIN | 180.30 | 9,700 |
| Hopkins | ARI | 9,100 | 9,000 | 175.50 | WAIVE | Thomas | NO | 176.80 | 9,400 |
| Hilton | IND | 6,000 | 5,800 | 175.50 | WAIVE | Lockett | SEA | 176.80 | 9,400 |
| Cole | JAX | 5,000 | 5,100 | 75.25 | WAIVE | Metcalf | SEA | 168.40 | 9,200 |
| TEs | | | | | | TEs | | | |
| Kelce | KC | 7,500 | 7,700 | 190.30 | WAIVE | Kittle | SF | 150.40 | 8,400 |
| Rudolph | MIN | 4,000 | 4,000 | 65.40 | WAIVE | Waller | LV | 130.65 | 7,200 |
| DST/Ks | | | | | | DST/Ks | | | |
| Saints | NO | 5,000 | 5,000 | 100.20 | WAIVE | Bears | CHI | 95.30 | 5,200 |
| Seahawks | SEA | 4,500 | 4,500 | 90.10 | WAIVE | Rams | LAR | 92.40 | 5,000 |
| | | 98,000 | 98,500 | | | | | | |

FIG. 8

| | League Dues | League Fees | Regular Season Payouts | Playoff Payouts | Yearly Total | Lifetime Earnings |
|---|---|---|---|---|---|---|
| League Bank | $ 1,000 | $ (50) | $ (250) | $ (700) | $ - | |
| Run CMC | $ (100) | $ - | $ 125 | $ - | $ 25 | $ 100 |
| Zeke & Destroy | $ (100) | $ - | $ - | $ - | $ (100) | $ (200) |
| Fresh Prince of Helaire | $ (100) | $ - | $ - | $ 400 | $ 300 | $ (100) |
| Can You Diggs It? | $ (100) | $ - | $ - | $ 200 | $ 100 | $ - |
| Ladies & Edelman | $ (100) | $ - | $ 125 | $ - | $ 25 | $ (300) |
| Gronkey Kong | $ (100) | $ - | $ - | $ - | $ (100) | $ 50 |
| Mahomes Alone | $ (100) | $ - | $ - | $ - | $ (100) | $ 25 |
| Dak to the Future | $ (100) | $ - | $ - | $ - | $ (100) | $ 75 |
| Shake it Goff | $ (100) | $ - | $ - | $ 100 | $ - | $ 100 |
| Julio Let the Dogs Out | $ (100) | $ - | $ - | $ - | $ (100) | $ - |
| *League Wide Items* | $ - | $ 50 | $ - | $ - | $ 50 | |

FIG. 9

FANTASY SPORTS TEAM LEAGUE

CROSS-REFERENCE TO RELATED APPLICATION

This application claims priority to, and the benefit of, U.S. Provisional Application No. 63/169,680, filed Apr. 1, 2021, for all subject matter common to both applications. The disclosure of said provisional application is hereby incorporated by reference in its entirety.

FIELD OF THE INVENTION

The present invention relates to fantasy sports. In particular, the present invention relates to a method and system for implementing a fantasy sports team league that makes use of a salary cap and a dynamic pricing model for managing team rosters during season-long competitions.

BACKGROUND

Generally, the fantasy sports market offers competitions where individuals ("fantasy managers" or "team managers") attempt to accumulate the highest possible score based on the actual performance of real-life athletes ("Players" or "scoring units"). Fantasy team managers compete in a variety of sports such as NFL football, MLB Baseball, NBA Basketball, NHL Hockey, PGA Golf, and NASCAR auto racing, to name just a few. It is estimated that as many as 50 million people play some type of NFL Fantasy Football, and popularity is growing within the United States. There are two major formats that currently exist for fantasy sports competitions, which are described in more detail below.

(#1) Season-Long Competitions

Season-long competitions offer a style of play where a group of individual fantasy team managers form a league to compete in the particular sport of interest. The competition is played over the duration of the underlying sport's season, and fantasy leagues often conduct some type of playoff toward the end of the fantasy season. Teams are constructed using some type of fantasy draft (such as a snake order or auction system) whereby each Player is allocated to only one fantasy team. Fantasy league commissioners can customize the scoring methodology utilized as well as the mechanism for how fantasy team managers are able to make changes to a roster (such as a waiver wire system or free-agent auction process). These leagues are managed and supported by a variety of websites, such as Yahoo!, ESPN, CBS Sports, and others.

(#2) Daily Fantasy Contests

Daily fantasy contests offer a style of play wherein fantasy team managers compete in a one-day contest in the particular sport of interest. Players can pay an entry fee to be eligible to win cash prizes or can play for free against a selected group of other fantasy team managers in a personal league. Fantasy team managers create a roster selecting any desired Players based on the host site position requirements. The host site designates the contest rules, assigns a salary cost to each Player, and determines an overall designated salary cap that fantasy team managers cannot exceed. The host site publishes new Player salary costs for each separate contest. These salary costs can move both upwards and downwards depending on a variety of factors, such as performance and oppositions. These leagues are managed and supported by a variety of websites, with the most well-known being products offered by Draftkings Inc. and FanDuel, Inc.

However, this technology, device, system, methodology, etc., experience some shortcomings. While both of these known formats (systems and methods) offer appealing features to fantasy team managers, they each exhibit several shortcomings discussed below:

(#1) Season-Long Competitions

Several often-cited issues with season-long competitions relate to the drafting rules, the drafting process, and impactful injuries. In the current environment, the draft rules dictate that each Player can only be assigned to one fantasy roster within a fantasy league. As a result, during the draft process, fantasy team managers may miss out on a desired Player if selected by another fantasy manager or if another fantasy manager pays slightly more in an auction process. Fantasy team managers may also panic or experience technical difficulties during a "live" draft process, thereby negatively impacting Player selection and disadvantaging that fantasy manager before the season even starts. Another issue relates to injuries and Player replacement. A high first or second round draft pick injured very early in the season can be devastating to a fantasy manager and almost impossible to overcome, thereby effectively ending the chances of success just as the season gets underway.

(#2) Daily Fantasy Contests

Several often-voiced concerns with daily contests relate to the time and research required for each new contest, the inability to benefit from identifying less popular and "breakout" Players earlier than other fantasy team managers, and the randomness of a single day contest. As these contests only last for a single day and salary costs are reset each week, a fantasy manager is essentially starting from scratch for each new contest. This can lead to a time-consuming and extensive research process, especially when considering the number of factors to be considered. In addition, any information gained during this research may only be beneficial for a limited amount of time, as the host site resets salary cost amounts for each new contest. Any advantage of finding any lesser-known or "breakout" Players can be short-lived. There is also an increased degree of randomness in a single day contest. While fantasy sports, in general, include a great deal of uncertainty and luck to a certain degree, a daily contest only exacerbates this issue as "star" Players can have an off-day during a one-day contest when selected by a fantasy manager, or a lesser-known Player can have a career day when not selected by that same fantasy manager.

SUMMARY

There is a need for other systems and methods of play that build on the positive aspects of the industry while at the same time addressing some of the shortcomings fantasy team managers currently experience in the existing systems and methods of play. The present invention is directed toward further solutions to address this need, in addition to having other desirable characteristics, including bonus actions that can be taken a number of times during a league season.

The disclosed fantasy sports team league in accordance with the present invention provides team managers with a way of competing in fantasy sports competitions that addresses the weaknesses of existing opportunities. The fantasy sports team league provides a season-long game-play system incorporating a salary cap and dynamic pricing model, and it provides several new and exciting features for fantasy team managers to experience.

In accordance with example embodiments of the present invention, a method of implementing a fantasy sports team league is provided. The method includes a) registering team managers for participation in the fantasy sports team league; b) establishing a list of potential scoring units available for selection; c) creating initial team rosters for each team manager; d) establishing team line-ups selected from team rosters for team managers participating in league competitions; e) calculating quantitative scores for the team line-ups based on metrics from real-world sports competitions associated with fantasy league competitions by players and/or teams in real-world sports competitions associated with scoring units in the line-ups; f) managing team rosters after initial roster selection for subsequent competitions allowing team managers to change their team rosters between subsequent competitions during a fantasy league; and g) repeating steps d) through f) until fantasy league season completes. A fantasy team league is thereby provided that is capable of continuously adapting based on the actions of the team managers as well as performance of scoring units and providing a uniform game-play format allowing competition between all registered team managers in addition to established league competitions.

The step c) of creating initial team rosters for each team manager further involves establishing a quantitative salary cap threshold; establishing an initial quantitative value for each potential scoring unit available for selection, wherein the initial quantitative value is determined based on a predicted performance of the potential scoring unit; receiving proposed selections of potential scoring units from each team manager for assembly into team rosters, wherein when a total sum of the quantitative value for each selected scoring unit does not exceed the quantitative salary cap threshold; accepting the proposed selections of potential scoring units from each team manager; and confirming a conforming a team roster for each team manager, thereby transforming the potential scoring units to confirmed scoring units;

The step f) of managing team rosters after initial roster selection for subsequent competitions allowing team managers to change their team rosters between subsequent competitions during a fantasy league season further involves selectively adding and/or removing confirmed scoring units from team rosters based on team salary wherein the salary for the team is adjusted accordingly based on a contemporaneous quantitative value of the scoring unit being added or removed, wherein the contemporaneous quantitative value of a scoring unit is dynamically determined based, at least in part on utilization of the scoring unit in the league.

In accordance with aspects of the present invention, the step of registering team managers further includes establishing a scoring system to which there is no customization or permitted changes for the fantasy sports team league.

In accordance with aspects of the present invention, a scoring unit is a player or group of players participating in organized live sports competitions.

In accordance with aspects of the present invention, each team roster must include a designated number of scoring units of a specific type. In some such aspects, each team roster must include a designated number of scoring units at each of a specified position on the roster.

In accordance with aspects of the present invention, each team roster cannot have more than a designated number of scoring units from a same live sports organization.

In accordance with aspects of the present invention, the method further includes establishing league competitions in which a team manager is participating.

In accordance with aspects of the present invention, establishing team line-ups selected from team rosters for team managers participating in league competitions further includes designating at least one scoring unit in each team line-up as being subject to a score multiplier. In some such aspects, the designation of at least one scoring unit on each team line-up as being subject to a score multiplier is performed for each league competition. In still further aspects, the designation of at least one scoring unit on each team line-up as being subject to a score multiplier is performed a predetermined number of times during the league season.

In accordance with aspects of the present invention, a number of selective additions and/or subtractions of scoring units is limited per league competition and wherein any selective additions and/or subtractions above this limit is subject to a scoring system penalty.

In accordance with aspects of the present invention, a number of selective additions and/or subtractions of scoring units are unlimited for a selected league competition. In certain aspects, a team manager is provided with an unlimited number of selective additions and/or subtractions of scoring units for a given league competition a limited number of total times in a season. In some such aspects, the team roster with the selective additions and/or subtractions of scoring units reverts back to the team roster prior to the selective additions and/or subtractions after the selected competition.

In accordance with aspects of the present invention, dynamically determining the contemporaneous quantitative value of a scoring unit based on the scoring unit's utilization in the league further involves determining a percentage of team rosters in the league where the scoring unit is a member and adjusting the value of the scoring unit based on a predetermined percentage.

In accordance with aspects of the present invention, the contemporaneous quantitative value of a scoring unit is further based on one or more of historical performance and predicted performance.

In accordance with aspects of the present invention, the method further includes calculating a season score for each team manager.

In accordance with aspects of the present invention, alternate league competitions are available after a set number of league competitions have occurred during a season. In certain aspects, the alternate league competitions have different standing determinations and advancement criteria from prior league competitions.

In accordance with aspects of the present invention, the method further includes providing standings for each team manager in the league. In certain aspects, the standings comprise one or more of scores, historical performance, financial standings, and membership dues. In some such aspects, this further includes providing rewards to team managers for standings.

In accordance with aspects of the present invention, establishing team line-ups selected from team rosters for team managers participating in league competitions is performed using a graphical user interface. The graphical user interface includes a graphical representation of the team line-up having positions to be filled by scoring units and a graphical representation of the team roster having one or more tokens representing scoring units. The one or more tokens representing scoring units are moved by a user from the graphical representation of the team roster to the graphical representation of the team line-up to fill the positions of the graphical representation of the team line-up to establish the team line-up. In some such aspects, the graphical user interface further provides for designating at least one scoring unit in each team line-up as being subject to a score multiplier, wherein the at least one scoring unit is designated by marking a token representing the scoring unit in a position of the graphical representation of the team line-up.

In accordance with example embodiments of the present invention, a fantasy sports team league system is provided. The system includes one or more personal computing devices configured to send, receive, and display data for a user and a host-site server in communication with the one or more personal computing devices over a network. The host-site server configured to a) register team managers for participation in the fantasy sports team league, b) establish a list of potential scoring units available for selection, c) create initial team rosters for each team manager, d) establish team line-ups selected from team rosters for team managers participating in league competitions, e) calculate quantitative scores for the team line-ups based on metrics from real world sports competitions associated with fantasy league competitions by players and/or teams in the real world sport competitions associated with scoring units in the line-ups, f) manage team rosters after initial roster selection for subsequent competitions allowing team managers to change their team rosters between subsequent competitions during a fantasy league season, and g) repeat steps d) through f) until fantasy league season completes. A fantasy team league is thereby provided that is capable of continuously adapting based on the actions of the team managers as well as performance of scoring units and providing a uniform game-play format allowing competition between all registered team managers in addition to established league competitions.

Step c) wherein the initial team rosters are created for each team manager further involves establishing a quantitative salary cap threshold; establishing an initial quantitative value for each potential scoring unit available for selection, wherein the initial quantitative value is determined based on a predicted performance of the potential scoring unit; receiving proposed selections of potential scoring units from each team manager for assembly into team rosters, wherein when a total sum of the quantitative value for each selected scoring unit does not exceed the quantitative salary cap threshold; accepting the proposed selections of potential scoring units from each team manager; and confirming a conforming a team roster for each team manager, thereby transforming the potential scoring units to confirmed scoring units.

Step f) wherein team rosters are managed after initial roster selection for subsequent competitions allowing team managers to change their team rosters between subsequent competitions during a fantasy league season further involves selectively adding and/or removing confirmed scoring units from team rosters based on team salary wherein the salary for the team is adjusted accordingly based on a contemporaneous quantitative value of the scoring unit being added or removed, wherein the contemporaneous quantitative value of a scoring unit is dynamically determined based, at least in part on utilization of the scoring unit in the league.

In accordance with aspects of the present invention, the registration of team managers further includes establishing a scoring system to which there is no customization or permitted changes for the fantasy sports team league.

In accordance with aspects of the present invention, a scoring unit comprises a player or group of players participating in organized live sports competitions.

In accordance with aspects of the present invention, each team roster must comprise a designated number of scoring units of a specific type. In certain aspects, each team roster must comprise a designated number of scoring units at each of a specified position on the roster.

In accordance with aspects of the present invention, each team roster cannot have more than a designated number of scoring units from a same live sports organization.

In accordance with aspects of the present invention, the host-site server is further configured to establish league competitions in which a team manager is participating.

In accordance with aspects of the present invention, the establishment of team line-ups selected from team rosters for team managers participating in league competitions further includes the designation of at least one scoring unit in each team line-up as being subject to a score multiplier. In certain aspects, the designation of at least one scoring unit on each team line-up as being subject to a score multiplier is performed for each league competition. In some such aspects, the designation of at least one scoring unit on each team line-up as being subject to a score multiplier is performed a predetermined number of times during the league season.

In accordance with aspects of the present invention, a number of selective additions and/or subtractions of scoring units is limited per league competition and wherein any selective additions and/or subtractions above this limit is subject to a scoring system penalty. In other aspects, a number of selective additions and/or subtractions of scoring units is unlimited for a selected league competition. In some such aspects, a team manager is provided with an unlimited number of selective additions and/or subtractions of scoring units for a given league competition a limited number of total times in a season. In still further aspects, the team roster with the selective additions and/or subtractions of scoring units reverts back to the team roster prior to the selective additions and/or subtractions after the selected competition.

In accordance with aspects of the present invention, dynamically determining the contemporaneous quantitative value of a scoring unit based on the scoring unit's utilization in league involves determining a percentage of team rosters in the league where the scoring unit is a member and adjusting the value of the scoring unit based on a predetermined percentage.

In accordance with aspects of the present invention, the contemporaneous quantitative value of a scoring unit is further based on one or more of historical performance and predicted performance.

In accordance with aspects of the present invention, the host-site server is further configured to calculate a season score for each team manager.

In accordance with aspects of the present invention, alternate league competitions are available after a set number of league competitions have occurred during a season. In certain aspects, the alternate league competitions have different standing determinations and advancement criteria from prior league competitions.

In accordance with aspects of the present invention, the host-site server is further configured to provide standings for each team manager in the league. In certain aspects, the standings include one or more of scores, historical performance, financial standings, and membership dues. In some such aspects, the host-site server is further configured to provide rewards to team managers for standings.

In accordance with aspects of the present invention, the establishment of team line-ups selected from team rosters for team managers participating in league competitions is performed using a graphical user interface provide by the host-site server and displayed on the one or more personal computing, The graphical user interface includes a graphical representation of the team line-up having positions to be filled by scoring units and a graphical representation of the team roster having one or more tokens representing scoring units. The one or more tokens representing scoring units are moved by a user from the graphical representation of the team roster to the graphical representation of the team line-up to fill the positions of the graphical representation of the team line-up to establish the team line-up. In certain aspects, at least one scoring unit in each team line-up is designated as being subject to a score multiplier, wherein the at least one scoring unit is designated by marking a token representing the scoring unit in a position of the graphical representation of the team line-up.

In accordance with example embodiments of the present invention, a method of implementing a fantasy sports team league is provided. The method includes a) registering team managers for participation in the fantasy sports team league; b) establishing a list of potential scoring units available for selection; c) creating initial team rosters for each team manager; d) establishing team line-ups selected from team rosters for team managers participating in league competitions including designating at least one scoring unit in each team line-up as being subject to a score multiplier; e) calculating quantitative scores for the team line-ups based on metrics from real-world sports competitions associated with fantasy league competitions by players and/or teams in the real world sports competitions associated with scoring units in the line-ups; f) managing team rosters after initial roster selection for subsequent competitions allowing team managers to change their team rosters between subsequent competitions during a fantasy league season; and g) repeating steps d) through f) until fantasy league season completes. A team manager further has the option of activating a feature for a specific competition which alters the way steps d) through f) are performed.

Step c) involving creating initial team rosters for each team manager further includes establishing a quantitative salary cap threshold; establishing an initial quantitative value for each potential scoring unit available for selection, wherein the initial quantitative value is determined based on a predicted performance of the potential scoring unit; receiving proposed selections of potential scoring units from each team manager for assembly into team rosters, wherein when a total sum of the quantitative value for each selected scoring unit does not exceed the quantitative salary cap threshold; accepting the proposed selections of potential scoring units from each team manager; and confirming a conforming a team roster for each team manager, thereby transforming the potential scoring units to confirmed scoring units.

Step f) involving managing team rosters after initial roster selection for subsequent competitions allowing team managers to change their team rosters between subsequent competitions during a fantasy league season further includes selectively adding and/or removing a predetermined number of confirmed scoring units from team rosters based on team salary wherein the salary for the team is adjusted accordingly based on a contemporaneous quantitative value of the scoring unit being added or removed, wherein the contemporaneous quantitative value of a scoring unit is dynamically determined based, at least in part on utilization of the scoring unit in the league.

In accordance with aspects of the present invention, the activation of features can be performed a predetermined number of times during the league season.

In accordance with aspects of the present invention, the activated feature comprises the designated at least one scoring unit as being subject to a score multiplier is subject to an enhanced score multiplier.

In accordance with aspects of the present invention, the activated feature comprises allowing an unlimited number of selective additions and/or subtractions of scoring units.

In accordance with aspects of the present invention, the activated feature comprises allowing an unlimited number of selective additions and/or subtractions of scoring units for the specific competition and reverts back to the team roster prior to the selective additions and/or subtractions after the specific competition.

In accordance with example embodiments of the present invention, a method of implementing a fantasy sports team league is provided. The method includes a) registering team managers for participation in the fantasy sports team league; b) establishing a list of potential scoring units available for selection; c) creating initial team rosters for each team manager, d) establishing team line-ups selected from team rosters for team managers participating in league competitions, wherein the establishing team line-ups is performed using a graphical user interface; e) calculating quantitative scores for the team line-ups based on metrics from real-world sports competitions associated with fantasy league competitions by players and/or teams in real-world sport competitions associated with scoring units in the line-ups; f) managing team rosters after initial roster selection for subsequent competitions allowing team managers to change their team rosters between subsequent competitions during a fantasy league season; and g) repeating steps d) through f) until fantasy league season completes.

Step c) involving creating initial team rosters for each team manager further includes establishing a quantitative salary cap threshold; establishing an initial quantitative value for each potential scoring unit available for selection, wherein the initial quantitative value is determined based on a predicted performance of the potential scoring unit; receiving proposed selections of potential scoring units from each team manager for assembly into team rosters, wherein when a total sum of the quantitative value for each selected scoring unit does not exceed the quantitative salary cap threshold; accepting the proposed selections of potential scoring units from each team manager; and confirming a conforming a team roster for each team manager, thereby transforming the potential scoring units to confirmed scoring units.

The graphical user interface includes a graphical representation of the team line-up having positions to be filled by scoring units and a graphical representation of the team roster having one or more tokens representing scoring units. The one or more tokens representing scoring units are moved by a user from the graphical representation of the team roster to the graphical representation of the team line-up to fill the positions of the graphical representation of the team line-up to establish the team line-up.

Step f) involving managing team rosters after initial roster selection for subsequent competitions allowing team managers to change their team rosters between subsequent competitions during a fantasy league season further includes selectively adding and/or removing a predetermined number of confirmed scoring units from team rosters based on team salary wherein the salary for the team is adjusted accordingly based on a contemporaneous quantitative value of the scoring unit being added or removed, wherein the contemporaneous quantitative value of a scoring unit is dynamically determined based, at least in part on utilization of the scoring unit in the league.

In accordance with aspects of the present invention, the method further includes designating at least one scoring unit in each team line-up as being subject to a score multiplier, wherein the at least one scoring unit is designated by marking a token representing the scoring unit in a position of the graphical representation of the team line-up.

In accordance with aspects of the present invention, the graphical user interface further comprises one or more buttons selectable by the team manager which activates a feature for a specific competition. In certain aspects, the selection of a button to activate a feature can be performed a predetermined number of times during the league season. In some such aspects, the activated feature comprises a designated at least one scoring unit as being subject to a score multiplier is subject to an enhanced score multiplier. In other aspects, the activated feature comprises allowing an unlimited number of selective additions and/or subtractions of scoring units. In further aspects, the activated feature comprises allowing an unlimited number of selective additions and/or subtractions of scoring units for the specific competition and reverts back to the team roster prior to the selective additions and/or subtractions after the specific competition.

BRIEF DESCRIPTION OF THE FIGURES

These and other characteristics of the present invention will be more fully understood by reference to the following detailed description in conjunction with the attached drawings, in which:

FIG. 4 is an example scoring scheme for a fantasy sports team league;

FIG. 8 is an example graphical interface provided for managing team rosters; and FIG. 9 is an example display provided to private or sub-group commissioners regarding the standings of team managers in private or sub-group competitions.

DETAILED DESCRIPTION

Figure 1:
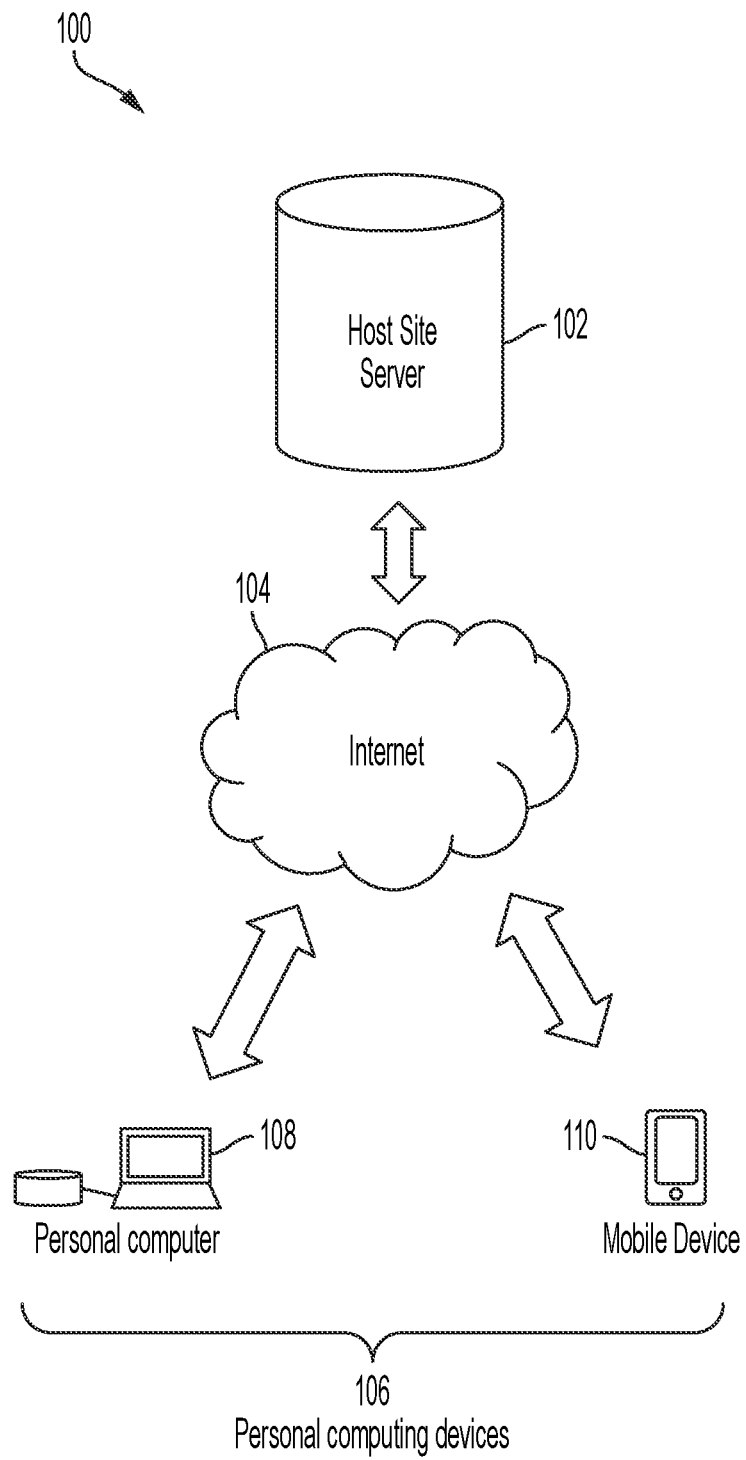
FIG. 1 is a block diagram depicting a network environment in which a fantasy sports team league is conducted.

An illustrative embodiment of the present invention relates to a new system and method for fantasy team managers to compete in the world of fantasy sports. Included below are additional details relating to scoring, special features, initial roster construction, league settings, starting line-ups, roster changes, and dynamic pricing. For illustrative purposes and to maintain consistency across these game-play features, some in-depth examples pertaining to fantasy football are included, although the game-play format will be applied in the same manner across all types of fantasy sports competitions, such that the present invention is not limited to play within the football format.

The present invention provides an improvement in the field of fantasy sports by overcoming the rigid methodologies of traditional season-long regarding roster management while also addressing the knowledge, research, and time cost associated with daily draft competition formats. The present invention achieves this by combining the best aspects of both season-long and daily fantasy competitions while minimizing or eliminating the problematic aspects those styles of competitions typically present, thereby providing an unconventional system and method for the implementation of fantasy sports leagues.

Some distinguishing features and functionality provided by the fantasy sports team league of the present invention include providing a technological solution and unconventional process for dynamic pricing wherein the contemporaneous quantitative value of a scoring unit is based in part on the percentage of teams in the fantasy sports league that the scoring unit is a member of. This allows the fantasy sports league to continuously adapt to the actions of the team managers as well as the performance of the scoring units. This addresses the rigid methodologies of roster management in typical season-long competitions without introducing the knowledge, research, and time cost typically associated with daily competitions. The provision of a graphical user interface provides a practical application that enables team managers to drag and drop scoring units into a graphical representation of the team line-up as well as allowing the team managers the unconventional process of designating scoring units as being subject to scoring multipliers; and additional features that can be activated by team managers that affect the operation of scoring, and roster management for a particular competition.

In addition, the fantasy sports team league of the present invention provides a consistent and standardized platform wherein a fantasy team manager is able to compete against all other registered fantasy team managers using the platform (in addition to participating in any established competitions, such as personal leagues) in a season-long competition to determine the best overall fantasy team manager for that particular sport in that particular season. This unconventional option is not currently available for fantasy team managers as no existing fantasy league system provides a methodology allowing an unlimited number of players to compete in a season-long competition under a uniform game-play format.

FIGS. 1 through 9 wherein like parts are designated by like reference numerals throughout, illustrate an example embodiment or embodiments for the implementation of a fantasy sports league, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 depicts an example network environment 100 in which the fantasy sports team league of the present invention is performed. Here, a host-site server 102 is provided to host the fantasy sports team league. Users interact with the host-site server 102 over the internet 104 via a personal computing device 106, such as a personal computer 108 or a mobile device 110, using a website or application, by which the user can send, receive, and display data allowing the user to register and participate as team managers and/or commissioners in the fantasy sports team league.

The host-site server 102 as well as the personal computing devices 106 can be any type of suitable electronic device capable of being specifically configured to perform the functionality of the present invention. The electronic device is merely an illustrative example of a suitable computing environment and in no way limits the scope of the present invention. An "electronic device," as represented by FIG. 1, can include a "workstation," a "server," a "laptop," a "desktop," a "hand-held device," a "mobile device," a "tablet computer," or other computing devices, as would be understood by those of skill in the art. Given that the electronic device has various electronic devices, including a server 102, personal computer 108, and mobile device 110 depicted for illustrative purposes, embodiments of the present invention may utilize any number of electronic devices in any number of different ways to implement a single embodiment of the present invention. Accordingly, embodiments of the present invention are not limited to a single electronic device, as would be appreciated by one with skill in the art, nor are they limited to a single type of implementation or configuration of the example electronic device. The electronic device will be discussed in more detail later in this description.

The internet 104, or similar cloud or other network, provides the network connectivity between the various components 102, 108, 110 of the system, allowing the components to communicate with each other. For example, the internet 104 allows the host-site server 102 and personal computing devices 106 to communicate with each other to implement the fantasy sports league of the present invention. While, in this example the internet is provided as the network connectivity between the components 102, 106, 108 of the system, it will be understood by ones skilled in the art that other types of networks or connectivity can be used.

Figure 2:
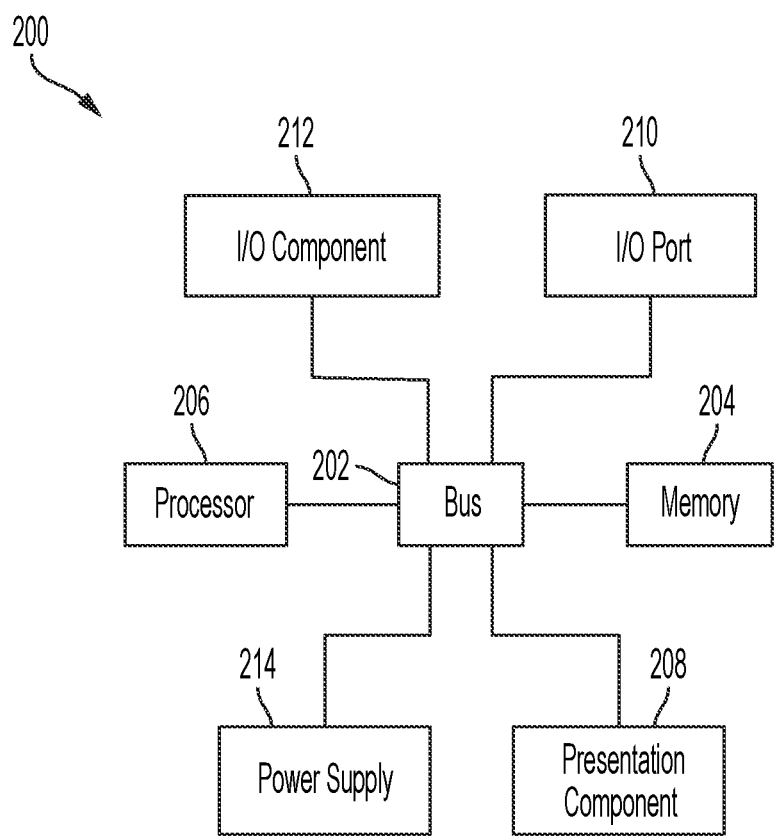
FIG. 2 is a block diagram of an electronic device used to implements a fantasy sports team league.

Any suitable and specifically configured electronic or computing device can be used to implement the server 102 and personal computing device 106 and the methods/functionality described herein. One illustrative example of such an electronic or computing device 200 is depicted in FIG. 2. The computing device 200 is merely an illustrative example of a suitable computing environment and in no way limits the scope of the present invention. A "computing device," as represented by FIG. 2, can include a "workstation," a "server," a "laptop," a "desktop," or other specifically configured computing devices, as would be understood by those of skill in the art. Given that the computing device 200 is depicted for illustrative purposes, embodiments of the present invention may utilize any number of computing devices 200 in any number of different ways to implement a single embodiment of the present invention. Accordingly, embodiments of the present invention are not limited to a single computing device 200, as would be appreciated by one with skill in the art, nor are they limited to a single type of implementation or configuration of the example computing device 200.

The computing device 200 can include a bus 202 that can be coupled to one or more of the following illustrative components, directly or indirectly: a memory 204, one or more processors 206, one or more presentation components 208, input/output ports 210, input/output components 212, and a power supply 214.

One of skill in the art will appreciate that the bus 202 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 2 is merely illustrative of an exemplary computing device that can be used to implement one or more embodiments of the present invention, and in no way limits the invention.

The computing device 200 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 200.

The memory 204 can include computer-storage media in the form of volatile and/or nonvolatile memory. The memory 204 may be removable, non-removable, or any combination thereof. Exemplary hardware devices are devices such as hard drives, solid-state memory, optical-disc drives, and the like. The computing device 200 can include one or more processors that read data from components such as the memory 204, the various I/O components 212, etc. Presentation component(s) 208 present data indications to a user or other device. Exemplary presentation components include a display device, speaker, printing component, vibrating component, etc.

The I/O ports 208 can enable the computing device 200 to be logically coupled to other devices, such as I/O components 212. Some of the I/O components 212 can be built into the computing device 200. Examples of such I/O components 212 include a microphone, joystick, recording device, gamepad, satellite dish, scanner, printer, wireless device, networking device, and the like.

Figure 3:
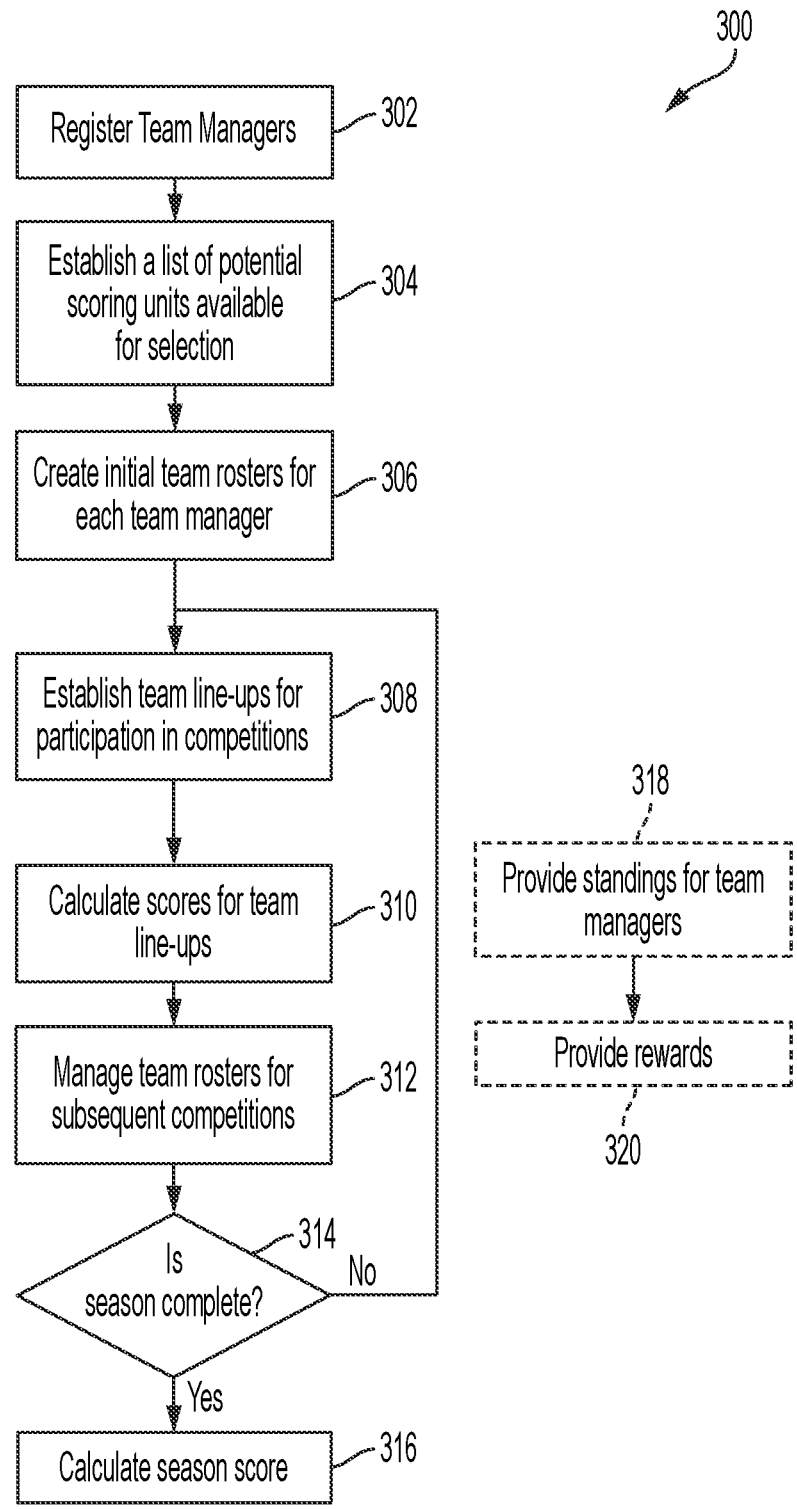
FIG. 3 is a flow diagram depicting a methodology for implementing a fantasy sports team league.

The functionality of the present invention is provided by the system and hardware of FIGS. 1-2 through the execution of software that transforms the hardware into specifically configured hardware suitable for implementing the technological advancements of the present invention. FIG. 3 depicts a flow diagram of a method 300 of one possible implementation of software processes operating on the server 102 and personal computing devices 106 of FIG. 1 to implement a fantasy sports team league in accordance with an embodiment of the present invention. The methodology includes: a) registering team managers for participation in the fantasy sports team league b) establishing a list of potential scoring units available for selection; c) creating initial team rosters for each team manager; d) establishing team line-ups selected from team rosters; e) calculating quantitative scores for the team line-ups based on metrics from real-world competitions associated with fantasy league competitions by players and/or teams in the real world competitions associated with scoring units in the line-ups; f) managing team rosters after initial roster selection for subsequent competitions allowing team managers to change their team rosters between subsequent competitions during a fantasy league season; and g) repeating step d) through f) until the fantasy league season completes. Each of these steps will be discussed in more detail below.

Registering team managers for participation in the fantasy sports team league as performed in step 302 of the method 300 of FIG. 3 involves collecting the necessary information from users to create an account, such as: username, password, contact information; billing information, etc. In certain embodiments, this information is provided by the users via the personal computing devices 106 and provided to the host-site server 102 via the internet. For example, the host-site server 102 could provide a website or other interface including forms or other prompts to fill out or respond to obtain this information. In other embodiments, an application is provided and executed on the personal computing devices 106 to provide the interface with the host-site server 102. In certain embodiments, a user may also register as a commissioner, wherein they can establish private or sub-group competitions in the fantasy league and invite other users to participate as team managers. In Fantasy Football, Commissioners will be able to determine items such as: whether the league has a regular season and playoffs or simply look at total points accumulated throughout the season; whether the regular season consists of weekly match-ups based on total points accumulated, head-to-head games, or a combination of a head-to-head match with a bonus win/loss game based on weekly scores; and whether the playoffs are head-to-head with predetermined brackets, head-to-head with reseeding, or points-based with the highest scoring teams advancing each round. Although these league settings may differ across the game-play format, all fantasy team managers will still be ranked on a system-wide basis based on total points accumulated. It should be understood that team managers are not required to be part of any Commissioner-managed personal or private leagues to participate.

Registering team managers may also include establishing which type of league or competition the team manager is participating in (football, baseball, basketball, hockey, etc.) and establishing team names or other identifiers for each team. In some embodiments, each team manager may be responsible for more than one team. In some such embodiments, the more than one team may be in different fantasy sports leagues. For example, a team manager may have a fantasy football team and a fantasy basketball team. In certain embodiments, the team managers may also select to participate in private or sub-group competitions or leagues in additional site-wide competitions.

In some embodiments, as part of the registering process (step 302) the rules for team composition and scoring are established. In certain embodiments, the rules and/or criteria for team composition and scoring are set at the time the team managers are registered so as to inform the team managers regarding how the league or competitions operate which the team manager can consider when assembling a team for competition in the league. In still further embodiments, the rules for composition and scoring are league-wide and no customization or changes are permitted to the rules for private or sub-group competitions or leagues. In accordance with example embodiments, the established rules for team composition and scoring are provided by the host-site server 102 and displayed to the registering team managers on the personal computing devices 106 in a web browser or application accessing or in communication with the host-site server 102 over the internet 104.

The rules for team composition and scoring may be based on the sport and type of competition desired. Each team comprises a team roster made up of scoring units. Scoring units are players or groups of players participating in organized live or real-world sports competitions. For example, a scoring unit could be an individual player, a unit on a team, a whole team, or some other grouping of players. In certain embodiments, the team roster composition for each team must comprise a designated number of scoring units of a specific type. In addition, in some embodiments, each team roster must comprise a designated number of scoring units at each of a specified position on the roster. In still further embodiments, each team roster cannot have more than a designated number of scoring units from a same live sports organization. For example, in accordance with one fantasy football league embodiment, each team roster must comprise: two (2) quarterbacks (QBs), four (4) running backs (RBs), five (5) wide receivers (WRs), two (2) tight ends (TEs), and two (2) combinations of defense, special teams, and kicker (DST/Ks) from the same real-world team. In this combination, kickers are grouped with the defense and special teams grouping. Furthermore, each team roster cannot have more than two scoring units from the same real-world sports team. This prevents the team managers from just selecting all the scoring units from the same team, such as the team that is predicted to perform the best. It should be understood that roster configurations can vary based on the sport, competition format, and scoring system. Other possible roster configurations will be apparent to one skilled in the art given the benefit of this disclosure.

The scoring is based on the performance of the scoring units in the real world. Points are assigned to metrics (points, yards, etc.) that are tracked during a live or real-world sports competition and are awarded (or subtracted) based on the scoring units that achieve the metrics and the team the scoring unit is on. An example of such a scoring system 400 can be seen in FIG. 4. This example scoring scheme 400 is based on the football team roster configuration discussed above (2 QBs, 4 RBs, 5 WRs, 2 TEs, 2 DST/Ks). It includes offensive scoring scheme 402 for points that can be obtained (or lost) by offensive scoring units (QBs, RBs, WRs, and TE) and a defensive scoring scheme 404 for points that can be obtained (or lost) by defensive, special teams, and kicking scoring units (DST/Ks). Other possible scoring systems or schemes are possible and may vary based on the sport and roster configuration. Other possible scoring systems will be apparent to one skilled in the art given the benefit of this disclosure.

Referring back to FIG. 3, the step of establishing a list of potential scoring units available for selection as set forth in step 304 involves identifying scoring units for which the sport the fantasy league corresponds. As set forth above, scoring units are players or groups of players participating in organized live sports competitions. For example, in the case of the fantasy football league discussed previously, the scoring units required for each team in the fantasy league are: QBs, RBs, WRs, TEs, and DST/Ks. Thus, all the QBs, RBs, WRs, TEs, and DST/Ks playing on real-world football teams on which the fantasy league is based on are identified and categorized based on type. For example, the real-world teams could be National Football League (NFL) teams, Canadian Football League (CFL) teams, College football teams (NCAA), or other school or organized teams. The list of potential scoring units includes at least the player's or unit's name (or other identifiers) and the player's or unit's position (QBs, RBs, WRs, TEs, or DST/Ks). In some embodiments, the team the player or unit is associated with is also provided. In certain embodiments, the historical and/or projected performance of the player or units is provided. In accordance with example embodiments, the establishing of the list of potential scoring units is performed at the host-site server 102 and displayed to the team managers on the personal computing devices 106 in a web browser or application accessing or in communication with the host-site server 102 over the internet 104.

Figure 5:
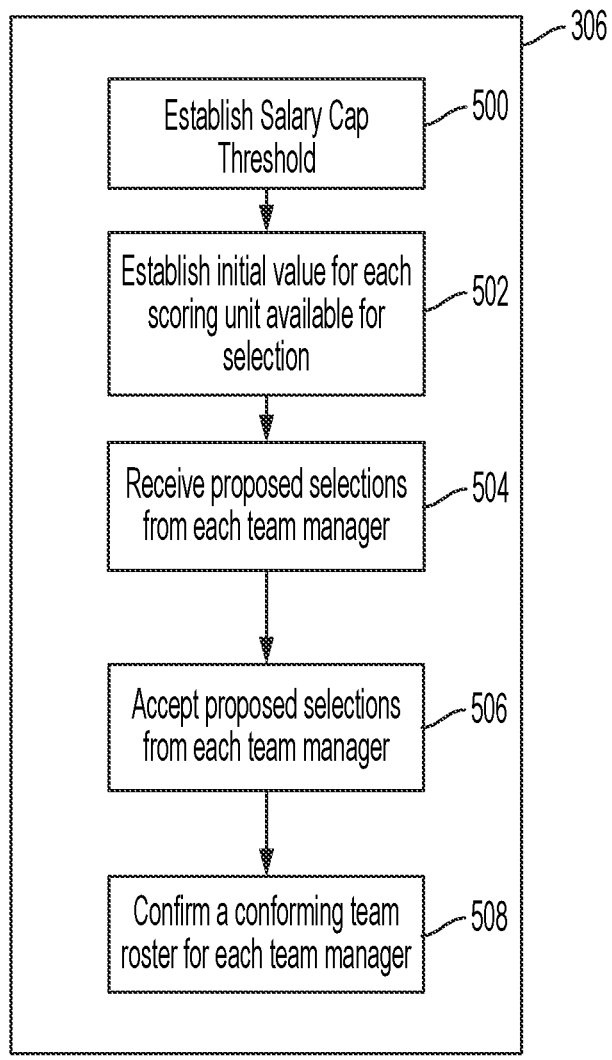
FIG. 5 is a flow diagram depicting a methodology for creating an initial team roster.

The step of creating initial team rosters for each team manager as set forth in step 306 involves several steps as set forth in FIG. 5. These include establishing a quantitative salary cap threshold (step 500), establishing an initial quantitative value for each potential scoring unit available for selection (step 502), receiving proposed selections of potential scoring units from each team manager for assembly into team rosters (step 504), accepting the proposed selections of potential scoring units from each team manager (step 506), and confirming a conforming a team roster for each team manager, thereby transforming the potential scoring units to confirmed scoring units (step 508). Each of these steps will be discussed in more detail below.

The step of establishing a quantitative salary cap as set forth in step 500 in FIG. 5 involves creating a spending limit for each team manager, which sets a theoretical cap as to how much a team manager can spend in assembling an initial team roster for competing in the fantasy sports team league. The quantitative salary cap of the fantasy league of the present invention is designed to mimic or otherwise be similar to the salary caps set on professional teams in professional sports leagues such as the National Football League (NFL), National Basketball Association (NBA), or National Hockey League (NHL) as a means of providing parity across the league. For example, in continuing with the fantasy example previously set forth, a quantitative salary cap is set at $100,000 and each team manager is required to assemble a roster where the total cost of the team roster must be under this salary cap. It should be understood that a dollar ($) value associated with the theoretical salary cap of the fantasy league is a theoretical currency chosen to mimic the real-life salary caps but is not actual currency. Points, "fantasy bucks", credits, or any other value system can be used to implement the salary cap. In accordance with example embodiments, establishing a quantitative salary cap is performed at the host-site server 102 and displayed to the team managers on the personal computing devices 106 in a web browser or application accessing or in communication with the host-site server 102 over the internet 104.

The step of establishing an initial quantitative value for each potential scoring unit available for selection as set forth in step 502 of FIG. 5 involves determining a value for each potential roster member identified in step 304 of FIG. 3. The quantitative value for each scoring unit is determined based on a predicted performance of the scoring unit. The predicted performance may be based on any number of criteria including, but not limited to, performance in past seasons, the strength of schedule of the upcoming season, team the scoring unit is a member of, team offensive or defensive philosophies, injuries, league rules, or other factors. The determined quantitative value also takes into consideration the salary cap established in step 500 of FIG. 5, such that it is possible to assemble a team roster within the salary cap. In accordance with example embodiments, establishing an initial quantitative value for each potential scoring unit available for selection is performed at the host-site server 102 and displayed to the team managers on the personal computing devices 106 in a web browser or application accessing or in communication with the host-site server 102 over the internet 104.

The step of receiving proposed selections of potential scoring units from each team manager for assembly into team rosters as set forth in step 504 of FIG. 5 involves each team manager selecting scoring units from the list of potential scoring units established in step 304 of FIG. 3 to assemble a team roster wherein each scoring unit selected has an initial value established in step 502 of FIG. 5 and submitting them for approval and acceptance in step 506. These selections should comply with the roster composition rules established at registration in step 302 of FIG. 3 and the salary cap threshold established in step 500 of FIG. 5. In accordance with example embodiments, the selections of potential scoring units for each team manager is performed on the personal computing devices 106 in a web browser or application and provided over the internet 104 wherein they are received by the host-site server 102.

The step of accepting the proposed selections of potential scoring units from each team manager as set forth in step 506 of FIG. 5 involves verifying whether the received proposed selections from each team manager comply with roster composition rules established at registration in step 302 of FIG. 3 and the salary cap threshold established in step 500 of FIG. 5. In particular, it is determined whether a total sum of the quantitative value for each selected scoring unit does not exceed the quantitative salary cap threshold. If the proposed selections do not comply, the non-compliant team is asked to submit new selections of potential scoring units (step 504). If the proposed selections do apply, then the team roster can be confirmed in step (step 506).

The step of confirming a team roster for each team manager, as set forth in step 508 of FIG. 5 involves notifying each team manager that their respective team roster is conforming to the roster composition rules established at registration in step 302 of FIG. 3 and the salary cap threshold established in step 500 of FIG. 5, such that they are eligible to compete in the fantasy league. In accordance with example embodiments, accepting of the proposed selections is performed at the host-site server 102 with the confirmation provided to the team managers on the personal computing devices 106 in a web browser or application accessing or in communication with the host-site server 102 over the internet 104.

Once an initial roster is established for a team manager, the team manager is eligible to compete in site-wide competitions of the fantasy league. In certain embodiments, each team manager may also elect to participate in private or sub-group competitions at this time.

Referring back to FIG. 3, the step of establishing team line-ups selected from team rosters for team managers participating in league competitions as set forth in step 308 involves each team manager selecting scoring units on their team roster that will be participating in a competition in the fantasy league. In a typical season format, the team lineup is established before each weekly competition. For example, the team lineup might need to be "locked in" 10 minutes before the real-world competitions that the fantasy competitions are based on begin. In other embodiments, a designated time such as 10:30 AM EST might be set as a deadline for establishing team line-ups. An example of a graphical interface 600 provided to team managers for establishing team line-ups in a fantasy football league can be seen in FIG. 6.

Figure 6:
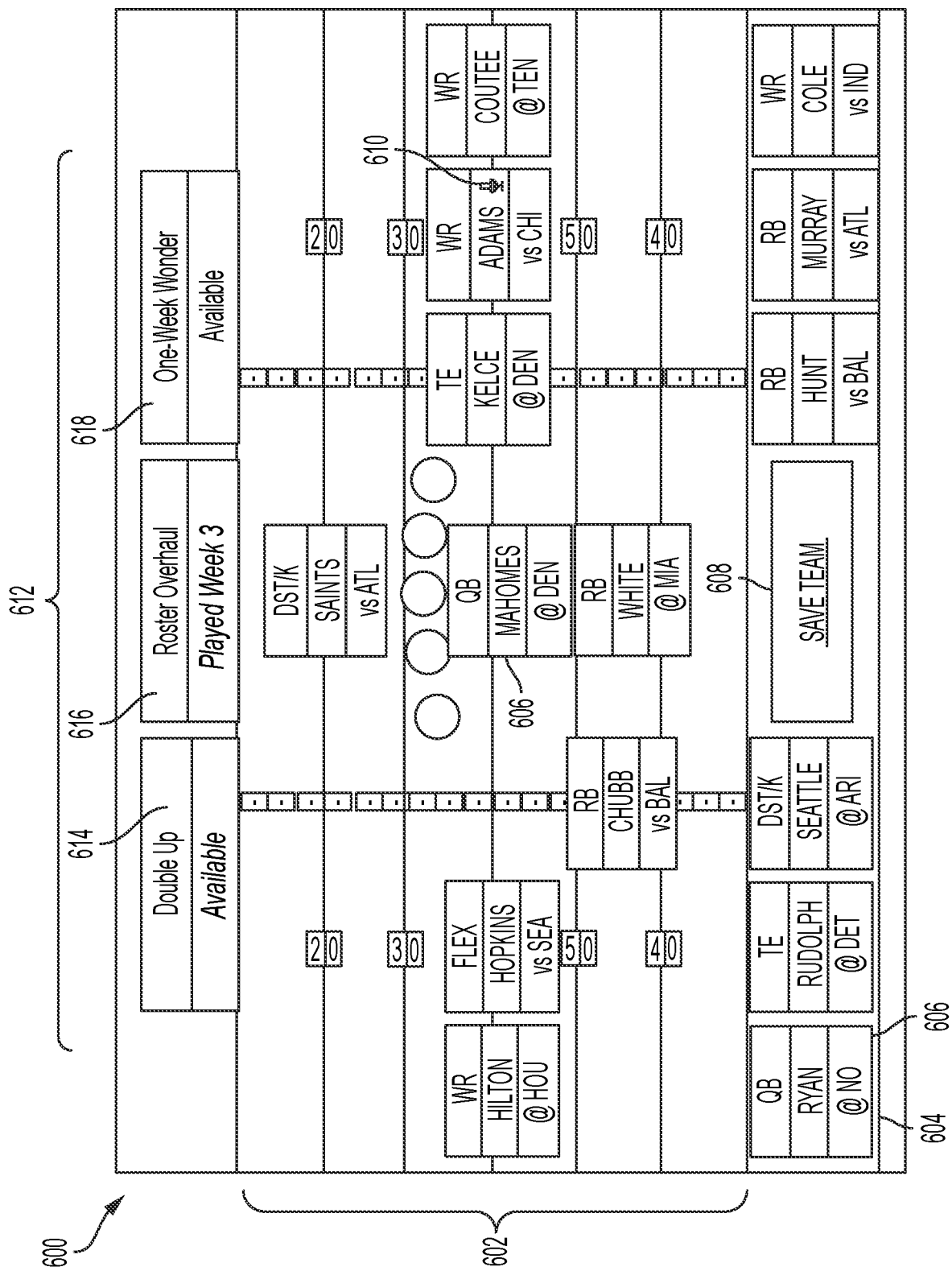
FIG. 6 is an example graphical interface provided for establishing team line-ups.

The graphical interface 600 of FIG. 6 is based on the fantasy football example previously discussed, wherein each team manager has a team roster of two (2) quarterbacks (QBs), four (4) running backs (RBs), five (5) wide receivers (WRs), two (2) tight ends (TEs), and two (2) combinations of defense, special teams, and kicker (DST/Ks) from the same real-world team from which they select a team line-up to participate in a particular competition, such a weekly match-up. In this example, the team line-up 602 comprises one (1) QB, two (2) RBs, two (2) WRs, one (1) TE, one (1) DST/K, and one (1) Flex position, which may be an RB, WR, or TE. The scoring units selected to fill these positions are selected from the team roster 604. In this example the positions of the team line-up 602 can be filled by moving (dragging and dropping) scoring units, represented by tokens 606, from the team roster 604 into the desired positions in the team line-up 602 (as long as the scoring unit is the correct type of scoring unit for that position). For example, the QB position on the team line-up 602 can only be filled by a scoring unit that is a QB. Once a team manager has filled the positions of the team line-up 602, they can elect to save the line-up thereby "locking in" the line-up for competition. In this example, this can be performed by clicking the "Save Team" button 608.

In certain embodiments, establishing team line-ups selected from team rosters for team managers participating in league competitions further comprises designating at least one scoring unit in each team line-up as being subject to an enhanced score multiplier. In some such embodiments, the designation of at least one scoring unit on each team line-up as being subject to a score multiplier is performed for each league competition. An example of this can be seen in FIG. 6, wherein the designated scoring unit is "Mic'd Up" indicating that the scoring unit is subject to a scoring multiplier, in this case, 1.5× the points earned by the scoring unit. Here, the "Mic'd Up" scoring unit is designated by marking on the scoring unit token 606 with a microphone icon 610.

The graphical interface 600 of FIG. 6 also provides access to other functionality or features 612 of the fantasy sports league of the present invention. In this example, this functionality 612 is referred to as "Timeouts" and access is provided by a series of buttons labeled "Double Up" 614, "Roster Overhaul" 616, and "One-Week Wonder" 618. The functionality or features, such as "Timeouts" 612 accessed by these buttons 614, 616, 618.

In accordance with example embodiments of the fantasy sports league of the present invention, each fantasy competition or sport will have several unique features available to all team managers. In certain embodiments, these unique features can consist of options available for each team line-up as well as options available to be used at a single point during the season. For example, in Fantasy Football, each team manager can be able to designate a "Mic'd Up" scoring unit, as shown and discussed in relation to FIG. 6, to receive 1.5 times the standard points scored in each competition. In addition, each team manager will also be allowed to use each of "3 Timeouts" at one point throughout the season. These timeouts include "Double Up", "Roster Overhaul", and "One-Week Wonder."

With the "Double Up" feature, the "Mic'd Up" scoring unit receives 2× instead of 1.5× the standard points in one game week. In the example of FIG. 6, this feature is activated with button 614. In certain embodiments, the availability of the feature for a team manager may be indicated. In FIG. 6 the button 614 also provided an indication that this feature is available to the team manager.

With the "Roster Overhaul" feature a team manager is allowed an unlimited number of additions and/or subtractions to a team roster. That is, a team manager is allowed an unlimited amount of transactions in a given game week and the new roster carries over to future game weeks. In the example of FIG. 6, this feature is activated with button 616. In certain embodiments, the availability of the feature for a team manager may be indicated. In FIG. 6 the button 616 also provided an indication that this feature was used in a previous competition and is not available to the team manager.

With the "One-Week Wonder" feature a team manager is allowed and an unlimited number of additions and/or subtractions to a team roster for a selected league competition, but the team roster reverts back to the roster prior to the selective additions and/or subtractions after the selected competition. Thus, a team manager is allowed an unlimited amount of transactions in one game week, but the roster returns to the previous lineup in the following week. In the example of FIG. 6, this feature is activated with button 618. In certain embodiments, the availability of the feature for a team manager may be indicated. In FIG. 6 the button 618 also provided an indication that this feature is available to the team manager.

It should be understood that the design and/or configuration of the user interface 600 could change based on the sport, roster configuration rules, and features or functionality provided. Other possible displays or user interfaces will be apparent to one skilled in the art given the benefit of this disclosure. In accordance with example embodiments, establishing team line-ups selected from team rosters for team managers participating in league competitions is performed at the host-site server 102 with the graphical user interface provided to the team managers on the personal computing devices 106 in a web browser or application accessing or in communication with the host-site server 102 over the internet 104.

Referring back to FIG. 3, the step of calculating quantitative scores for the team line-ups as set forth in step 310 involves calculating the points earned or lost by each scoring unit in the team line-up based metrics from real-world sports competitions associated with fantasy league competitions by players and/or teams in the real world sports competitions associated with scoring units in the fantasy line-ups. The scoring is based on the performance of the scoring units in the real world. Points are assigned to metrics (points, yards, etc.) that are tracked during a live or real-world sports competition and are awarded (or subtracted) based on the scoring units that achieve the metrics and the team the scoring unit is on. As previously discussed, an example of such a scoring system 400 can be seen in FIG. 4. This example scoring scheme 400 is based on the football team roster configuration discussed above (2 QBs, 4 RBs, 5 WRs, 2 TEs, 2 DST/Ks). It includes offensive scoring scheme 402 for points that can be obtained (or lost) by offensive scoring units (QBs, RBs, WRs, and TE) and a defensive scoring scheme 404 for points that can be obtained (or lost) by defensive, special teams, and kicking scoring units (DST/Ks). Other possible scoring systems or schemes are possible and may vary based on the sport and roster configuration. Other possible scoring systems will be apparent to one skilled in the art given the benefit of this disclosure. In accordance with example embodiments, the calculation of the quantitative scores is performed at the host-site server 102 and displayed to the team managers on the personal computing devices 106 in a web browser or application accessing or in communication with the host-site server 102 over the internet 104.

Referring again to FIG. 3, the step of managing team rosters after initial roster selection for subsequent competitions as set forth in step 312 allows team managers to change their team rosters between subsequent competitions during a fantasy league season. This is done by selectively adding and/or removing confirmed scoring units from team rosters based on team salary wherein the salary for the team is adjusted accordingly based on a contemporaneous quantitative value of the scoring unit being added or removed. The contemporaneous quantitative value of a scoring unit is dynamically determined based, at least in part on utilization of the scoring unit in the league.

As discussed previously, the initial roster is created (step 306) based on the established salary cap (step 500 of FIG. 5) and the established initial value for each scoring unit (step 502). However, the value for each scoring unit is dynamic and changes throughout the league season. The contemporaneous quantitative value of a scoring unit is dynamically determined based, at least in part on utilization of the scoring unit in the league. That is, the value of the scoring unit will change based on the number of other team rosters of which the scoring unit is a member. This involves determining a percentage of team rosters in the league where the scoring unit is a member and adjusting the value of the scoring unit based on a determined percentage. An example of how a scoring unit's contemporaneous quantitative value can be adjusted based on a percentage of ownership can be seen in table 700 of FIG. 7. In some embodiments, the contemporaneous quantitative value of a scoring unit is further based on one or more of historical performance and predicted performance. The historical performance is the scoring unit's performance in previous competitions, such as points earned to date, in the current fantasy league season. The predicted performance may be based on any number of criteria including, but not limited to, performance in past seasons, the strength of schedule of the upcoming season, team the scoring unit is a member of, team offensive or defensive philosophies, injuries, league rules, or other factors.

Figure 7:
FIG. 7 is an example scheme of how a scoring unit's contemporaneous quantitative value can be adjusted based on percentage of ownership.

In accordance with example embodiments, the pricing factor or scales used to determine the contemporaneous quantitative value of a scoring unit such as table 700 of FIG. 7 are provided by the host-site server 102 and displayed to the team managers on the personal computing devices 106 in a web browser or application accessing or in communication with the host-site server 102 over the internet 104.

An example of a graphical user interface 800 that can be used to manage a team roster can be seen in FIG. 8. Here the graphical user interface includes a status bar 802 that notifies the team manager of the number of free transfers (additions and/or subtractions to team roster) that are available. In certain embodiments, the number of additions or subtractions allowed before each competition is limited. In some such embodiments, exceeding the limit for additions and/or subtractions will result in a penalty, such as points or score deduction. In still other embodiments, a certain number of unused additions and/or subtractions can be saved or carried over to be used in subsequent competitions. For example, with the fantasy football embodiment described herein, the number of free transfers may be limited to two (2) transactions (additions and/or subtractions) per weekly matchup wherein any transactions over two (2) will cost the team manager −10 points per transaction. In addition, a team manager may save or carry over one (1) transaction to a subsequent competition but may never have more than three (3) penalty or cost-free transactions per competition. Where additional features such as the previously discusses "Timeouts" are provided as part of the fantasy sports league, the availability of those features can also be displayed as shown in status bar 802.

Under the status bar 802 for the example graphical interface 800 of FIG. 8 are columns for the current team roster 804 for the team manager and a listing of scoring units 806 available to be added to the team roster 804. Here the column for the current team roster 804 includes sub-columns 808 for Player (scoring unit), Team (real-world team the scoring unit is associated with), Investment cost (the initial quantitative value of the scoring unit), Current price (the contemporaneous quantitative value of the scoring unit), and Total Points (Points earned by scoring unit to date). The column for the team roster 804 further includes rows for each scoring unit grouped by position (QBs 810, RBs 812, WRs 814, TEs 816, DST/Ks 818) with a corresponding entry for each sub-column. In this embodiment, the row for each scoring unit is further provided with a "Waive" button 820. Activating the "Waive" button 820 removes or subtracts the scoring unit from the team roster 804. In the example embodiment of FIG. 8 team roster totals 822 are provided for the Investment Cost (the total initial quantitative value for all of the scoring units on the team roster) and Current Value (the total contemporaneous quantitative value of all the scoring units on the team roster). Because of the dynamic quality of the contemporaneous quantitative value of the scoring units, it is possible for the total current value of team roster to vary from the investment (initial) cost to assemble the team roster. Accordingly, the quantitative salary cap threshold established when assembling the team roster no longer applies to the team roster management after initial roster formation. Instead, the Current Value (contemporaneous quantitative value) of the scoring units as provided here determines if a team manager has the resources available (by subtracting a scoring unit, using the "Waive" button 820) to add a new scoring unit.

The scoring units available to be added to team roster are listed in the "Free Agents" (scoring units available to be added) column 806. Here the column for the scoring units available 806 includes sub-columns 824 for Available Player (available scoring unit), Team (real-world team the scoring unit is associated with), Total Points (Points earned by scoring unit to date), and Current price (the contemporaneous quantitative value of the scoring unit). The column for the scoring units available 806 further includes rows for each scoring unit grouped by position (QBs 826, RBs 828, WRs 830, TEs 832, DST/Ks 834) with a corresponding entry for each sub-column. In certain embodiments, when a scoring unit on the current roster 804 is waived or subtracted from the roster and funds are available, an "Add Player" button (not shown) will appear on the row for each scoring unit that has a Current Price lower than the funds available after subtracting the scoring unit. Activating the "Add Player" button will add the scoring unit to the current team roster.

It should be understood that the design and/or configuration of the user interface 800 could change based on the sport, roster configuration rules, and features or functionality provided. Other possible displays or user interfaces will be apparent to one skilled in the art given the benefit of this disclosure. In accordance with example embodiments, managing team rosters after initial roster selection is performed at the host-site server 102 with the graphical user interface provided to the team managers on the personal computing devices 106 in a web browser or application accessing or in communication with the host-site server 102 over the internet 104.

Referring again to FIG. 3, the steps of establishing team line-ups (step 308), calculating score (step 310), and managing team rosters (step 312) are repeated as necessary until the fantasy season is completed (step 314) at which point a season score is calculated (step 316). The season score is the total of each score as calculated at step 310 until the season is completed. In some embodiments, alternate league competitions are available after a set number of league competitions have occurred during a season.

For the example fantasy football league set forth embodiments described herein, the season can comprise a regular season and a playoff. The regular season typically consists of the first fourteen (14) competitions corresponding to the first fourteen (14) weeks of the real-world NFL season. In some embodiments, during the regular season, scoring in the fantasy football league can be based one of three options: traditional head-to-head competitions, total points, or head-to-head with a bonus. Head-to-head is where a team manager is matched against another team manager in the competition. Total points is where the team manager with the most point (for a given week) is the winner. Head-to-head with Bonus is like traditional head-to-head but with extra win/loss for being top/bottom half of points totals (for a given week). The playoffs typically consist of the last three (3) competitions corresponding to the last three (3) weeks of the season. In some embodiments, during the playoff, scoring in the fantasy football league can be based one of three options: head-to-head with determined brackets, head-to-head with reseeding, or total points with highest teams advancing.

In certain embodiments, the fantasy sports team league of the present invention can provide further functionality. For example, standings for each team manager may be provided as set forth in step 318 in FIG. 3, and accessed by the team manager. In some such embodiments, the standings can be provided at any time during a fantasy season. The standings for team managers can include scores, historical performance, rankings, financial standings, membership dues, or any other number or metrics that can be tracked by the system. In some embodiments, where there are commissioners running private or sub-group leagues, the standings of team managers can be provided as part of a "commissioner" view providing the financial status of members of the private or sub-group. An example of this can be seen in the example display 900 of FIG. 9.

The display 900 of FIG. 9 includes a series of categories or columns including League Dues 902, League Fees 904, Regular Season Payouts 906, Playoff Payouts 908, Yearly Total 910, and Lifetime Earnings 912. Entries in these columns are provided in series of rows pertaining to the private or sub-group including League Bank 914, private or sub-group members 916, and League-wide items 918. In certain embodiments, this display 900 is provided to the designated commissioners of the respective private or sub-group.

It should be understood that the design and/or configuration of the provided team manager standings could change based on the sport, roster configuration rules, and features or functionality provided. Other possible displays or user interfaces will be apparent to one skilled in the art given the benefit of this disclosure. In accordance with example embodiments, team manager standings are provided by the host-site server 102 and provided to the team managers on the personal computing devices 106 in a web browser or application accessing or in communication with the host-site server 102 over the internet 104.

Referring again to FIG. 3, in certain additional embodiments, rewards and or penalties can be provided to team managers for their standings in the fantasy team sport league as set forth in step 320. The rewards can include monetary rewards or penalties (payouts or fees), point awards, functionality awards (extra "Timeouts"), promotions, or other incentives for participation and/or performance.

The fantasy sports team league of the present invention provides a new format for playing fantasy sports (as opposed to traditional season-long competitions or daily fantasy contests). The fantasy sports team league of the present invention provides team managers a different way of competing in fantasy sports competitions that addresses the weaknesses of existing opportunities. The described season-long game-play format incorporates a salary cap and dynamic pricing model and provides several new and exciting features for fantasy team managers to experience.

The provided fantasy team league is capable of continuously adapting based on the actions of the team managers as well as performance of scoring units and providing a uniform game-play format allowing competition between all registered team managers in addition to established league competitions.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method of implementing a fantasy sports team league that dynamically and contemporaneously changes based on the activity of participating team managers, the method comprising:

a) registering team managers for participation in the fantasy sports team league;

b) establishing a list of potential scoring units available for selection;
c) creating initial team rosters for each team manager by:
  establishing a quantitative salary cap threshold;
  establishing an initial quantitative value for each potential scoring unit available for selection, wherein the initial quantitative value is determined based on a predicted performance of the potential scoring unit;
  receiving proposed selections of potential scoring units from each team manager for assembly into team rosters, wherein when a total sum of the quantitative value for each selected scoring unit does not exceed the quantitative salary cap threshold;
  accepting the proposed selections of potential scoring units from each team manager; and
  confirming a conforming team roster for each team manager, thereby transforming the potential scoring units to confirmed scoring units;
d) establishing team line-ups selected from team rosters for team managers participating in league competitions;
e) calculating quantitative scores for the team line-ups based on metrics from real-world sports competitions associated with fantasy league competitions by players and/or teams in the real-world sport competitions associated with scoring units in the line-ups;
f) managing team rosters after initial roster selection for subsequent competitions allowing team managers to change their team rosters between subsequent competitions during a fantasy league season by:
  selectively adding and/or removing, via a graphical user interface, confirmed scoring units from team rosters based on team salary wherein the salary for each team is adjusted accordingly based on a contemporaneous quantitative value of the scoring unit being added or removed, wherein the contemporaneous quantitative value of a scoring unit is dynamically determined based, at least in part on utilization of the scoring unit in the league, wherein the team salary and contemporaneous quantitative value of the scoring unit is based on, during implementation of the fantasy sports team league, the adding and/or removing of scoring units made by all participating team managers such that the salary cap, contemporaneous quantitative value of a scoring unit, and selectable functionality or features displayed to a team manager uniquely updates for each team manager when managing team rosters; and
g) repeating steps d) through f) until fantasy league season completes;
thereby providing a fantasy team league that is capable of continuously adapting based on the actions of the team managers as well as performance of scoring units and providing a uniform game-play format allowing competition between all registered team managers in addition to established league competitions.

2. The method of claim 1, wherein the step of registering team managers further comprises establishing a scoring system to which there is no customization or permitted changes for the fantasy sports team league.

3. The method of claim 1, wherein a scoring unit comprises a player or group of players participating in organized live sports competitions.

4. The method of claim 1, wherein each team roster must comprise a designated number of scoring units of a specific type.

5. The method of claim 4, wherein each team roster must comprise a designated number of scoring units at each of a specified position on the roster.

6. The method of claim 1, wherein each team roster cannot have more than a designated number of scoring units from a same live sports organization.

7. The method of claim 1, further comprising establishing league competitions in which a team manager is participating.

8. The method of claim 1, wherein establishing team line-ups selected from team rosters for team managers participating in league competitions further comprises designating at least one scoring unit in each team line-up as being subject to a score multiplier.

9. The method of claim 8, wherein the designation of at least one scoring unit on each team line-up as being subject to a score multiplier is performed for each league competition.

10. The method of claim 8, wherein the designation of at least one scoring unit on each team line-up as being subject to a score multiplier is performed a predetermined number of times during the league season.

11. The method of claim 1, wherein a number of selective additions and/or subtractions of scoring units is limited per league competition and wherein any selective additions and/or subtractions above this limit is subject to a scoring system penalty.

12. The method of claim 1, wherein a number of selective additions and/or subtractions of scoring units is unlimited for a selected league competition.

13. The method of claim 12, wherein a team manager is provided with an unlimited number of selective additions and/or subtractions of scoring units for a given league competition a limited number of total times in a season.

14. The method of claim 12, wherein the team roster with the selective additions and/or subtractions of scoring units reverts back to the team roster prior to the selective additions and/or subtractions after the selected competition.

15. The method of claim 1, wherein dynamically determining the contemporaneous quantitative value of a scoring unit based on the scoring unit's utilization in league comprises:
  determining a percentage of team rosters in the league where the scoring unit is a member; and
  adjusting the value of the scoring unit based on a predetermined percentage.

16. The method of claim 1, wherein the contemporaneous quantitative value of a scoring unit is further based one or more of historical performance and predicted performance.

17. The method of claim 1, further comprising:
  calculating a season score for each team manager.

18. The method of claim 1, wherein alternate league competitions are available after a set number of league competitions have occurred during a season.

19. The method of claim 18, wherein the alternate league competitions have different standing determinations and advancement criteria from prior league competitions.

20. The method of claim 1, further comprising providing standings for each team manager in the league.

21. The method of claim 20, wherein the standings comprise one or more of scores, historical performance, financial standings, and membership dues.

22. The method of claim 20, further comprising providing rewards to team managers for standings.

23. The method of claim 1, wherein establishing team line-ups selected from team rosters for team managers participating in league competitions is performed using the graphical user interface comprising:
- a graphical representation of the team line-up having positions to be filled by scoring units; and
- a graphical representation of the team roster having one or more tokens representing scoring units;
- wherein, the one or more tokens representing scoring units are moved by a user from the graphical representation of the team roster to the graphical representation of the team line-up to fill the positions of the graphical representation of the team line-up to establish the team line-up.

24. The method of claim 23, further comprising designating at least one scoring unit in each team line-up as being subject to a score multiplier, wherein the at least one scoring unit is designated by marking a token representing the scoring unit in a position of the graphical representation of the team line-up.

25. A fantasy sports team league system that dynamically and contemporaneously changes based on the activity of participating team managers, the system comprising:
- one or more personal computing devices configured to send, receive, and display data for a user;
- a host-site server in communication with the one or more personal computing devices over a network, the host-site server configured to:
  - a) register team managers for participation in the fantasy sports team league;
  - b) establish a list of potential scoring units available for selection;
  - c) create initial team rosters for each team manager by:
    - establishing a quantitative salary cap threshold;
    - establishing an initial quantitative value for each potential scoring unit available for selection, wherein the initial quantitative value is determined based on a predicted performance of the potential scoring unit;
    - receiving proposed selections of potential scoring units from each team manager for assembly into team rosters, wherein when a total sum of the quantitative value for each selected scoring unit does not exceed the quantitative salary cap threshold;
    - accepting the proposed selections of potential scoring units from each team manager; and
    - confirming a conforming a team roster for each team manager, thereby transforming the potential scoring units to confirmed scoring units;
  - d) establish team line-ups selected from team rosters for team managers participating in league competitions;
  - e) calculate quantitative scores for the team line-ups based on metrics from real-world sports competitions associated with fantasy league competitions by players and/or teams in the real-world sport competitions associated with scoring units in the line-ups;
  - f) manage team rosters after initial roster selection for subsequent competitions allowing team managers to change their team rosters between subsequent competitions during a fantasy league season by:
    - selectively adding and/or removing, via a graphical user interface, confirmed scoring units from team rosters based on team salary wherein the salary for each team is adjusted accordingly based on a contemporaneous quantitative value of the scoring unit being added or removed, wherein the contemporaneous quantitative value of a scoring unit is dynamically determined based, at least in part on utilization of the scoring unit in the league, wherein the team salary and contemporaneous quantitative value of the scoring unit is based on, during implementation of the fantasy sports team league, the adding and/or removing of scoring units made by all participating team managers such that the salary cap, contemporaneous quantitative value of a scoring unit, and selectable functionality or features displayed to a team manager on a user device uniquely updates for each user when managing team rosters on the host site server; and
  - g) repeat steps d) through f) until fantasy league season completes;
- thereby providing a fantasy team league that is capable of continuously adapting based on the actions of the team managers as well as performance of scoring units and providing a uniform game-play format allowing competition between all registered team managers in addition to established league competitions.

26. The system of claim 25, wherein the host-site server is further configured to establish league competitions in which a team manager is participating.

27. The system of claim 25, wherein the host-site server is further configured to calculate a season score for each team manager.

28. The system of claim 25, wherein the host-site server is further configured to provide standings for each team manager in the league.

29. The system of claim 28, wherein the host-site server is further configured to provide rewards to team managers for standings.

30. The system of claim 25, wherein the establishment of team line-ups selected from team rosters for team managers participating in league competitions is performed using the graphical user interface provided by the host-site server and displayed on the one or more personal computing, the graphical user interface comprising:
- a graphical representation of the team line-up having positions to be filled by scoring units; and
- a graphical representation of the team roster having one or more tokens representing scoring units;
- wherein, the one or more tokens representing scoring units are moved by a user from the graphical representation of the team roster to the graphical representation of the team line-up to fill the positions of the graphical representation of the team line-up to establish the team line-up.

31. The system of claim 30, wherein at least one scoring unit in each team line-up is designated as being subject to a score multiplier, wherein the at least one scoring unit is designated by marking a token representing the scoring unit in a position of the graphical representation of the team line-up.

* * * * *